(12) United States Patent
Kettler et al.

(10) Patent No.: US 6,584,747 B2
(45) Date of Patent: Jul. 1, 2003

(54) FLOOR TILE

(75) Inventors: Volker Kettler, Werther (DE); Bernd Schneider, Lage/Billinghausen (DE); Wolfgang Wienstroer, Rheda-Wiedenbruck (DE)

(73) Assignee: HW-Industries GmbH & Co. KG, Dissen (DE)

( * ) Notice: Subject to any disclaimer, the term of this patent is extended or adjusted under 35 U.S.C. 154(b) by 0 days.

(21) Appl. No.: 09/862,581

(22) Filed: May 23, 2001

(65) Prior Publication Data

US 2002/0007606 A1 Jan. 24, 2002

(30) Foreign Application Priority Data

Jun. 29, 2000 (DE) .......................... 100 31 639

(51) Int. Cl.$^7$ ............................ E04F 15/04; E04F 15/10
(52) U.S. Cl. ...................................... 52/592.2; 52/592.4
(58) Field of Search ............................ 52/591.3, 592.2, 52/591.1, 592.1, 592.4, 589.1

(56) References Cited

U.S. PATENT DOCUMENTS

| | | | |
|---|---|---|---|
| 713,577 A | * | 11/1902 | Wickham |
| 3,310,919 A | * | 3/1967 | Bue et al. |
| 4,287,693 A | | 9/1981 | Collette .................... 52/177 |
| 5,797,237 A | | 8/1998 | Finkell, Jr. ............... 52/589.1 |
| 5,950,378 A | | 9/1999 | Council et al. ............ 52/177 |
| 6,385,936 B1 | * | 5/2002 | Schneider |

FOREIGN PATENT DOCUMENTS

| DE | 3041781 | * | 6/1982 |
|---|---|---|---|
| DE | 19854475 | | 11/1998 |
| DE | 20002413 | | 4/2000 |

* cited by examiner

Primary Examiner—Michael Safavi
(74) Attorney, Agent, or Firm—Stevens, Davis, Miller & Mosher, L.L.P.

(57) ABSTRACT

A floor tile, in particular a laminate panel, parquet element, veneer floor element, ready-to-lay parquet element or such like comprises an edge profile on at least two opposite edges in the form of a modified groove and tongue joint for the purpose of connecting adjacent tiles, with a coincident arrangement consisting of one groove and one tongue on each of at least two edges, of which the tongue on one edge of a first tile and the groove in an associated edge of a second tile rise obliquely upwards from the bottom of the tile. The edge profiles are contrived directly in the support material of the floor tile, the groove in the first tile is disposed directly above its tongue and the lower wall of this groove falls off towards the back end of the groove by the same degree as the tongue on the first tile rises upwards. The upper wall of the groove in the first tile runs essentially parallel to the plane of the tile, and the tongue on the second tile matches the shape of the groove in the first tile by having a top surface that runs essentially parallel to the plane of the tile and a bottom surface that falls off towards the end of the tongue.

13 Claims, 3 Drawing Sheets

FLOOR TILE

This invention relates to a floor tile, in particular a laminate panel, parquet element, veneer floor element, ready-to-lay parquet element or such like, with an edge profile on at least two opposite edges in the form of a modified groove and tongue joint for the purpose of connecting adjacent tiles, with a coincident arrangement consisting of one groove and one tongue on each of at least two edges, of which the tongue on one edge of a first tile and the groove in an associated edge of a second tile rise obliquely upwards from the bottom of the tile.

A floor tile or this type is disclosed in DE 33 43 604 C2. In this prior art tile, the act of connecting two identical tiles results in a "modified" groove and tongue joint in that adjacent tiles are held in position by the joint relative to each other in both the vertical and horizontal directions, i.e. they cannot come apart unintentionally. Although this horizontal fixation can also be achieved by glueing together adjacent tiles provided with a simple groove and tongue joint, the glueing process involves considerably more work when laying the flooring, and joints of this kind are often not sufficiently long-lasting.

In practice, there is therefore a preference for the type of edge profiles that guarantee an interlocking connection between adjacent tiles in the horizontal direction as well, without glueing being required.

Interlocking joints of this type are disclosed in the above-mentioned publication as well as in GB 2 256 023 A, WO 98/58142, U.S. Pat. No. 4,426,820, DE-OS 2 238 660, DE 79 28 703 U1 and DE 198 54 475 A1.

In the process of laying the floor tiles described here, the edge profile of each consecutive tile is generally held at an angle and pushed or slotted into the edge profile of a tile that has already been laid, and then lowered into a horizontal position. This ensures that both edge profiles lock into each other. A floor surface that has been laid in this way is removed by executing the steps in reverse order. This type of assembly or disassembly method means that a kind of articulated joint, which allows the tiles to be angled up and down, occurs at the adjacent edges. In prior art solutions, the consequence of this is that the modified groove and tongue joint has low resistance to buckling, and adjacent tiles may bulge or collapse in the vicinity of the joint which separates them. This low resistance to buckling is naturally unacceptable in the context of the glueless laying method that is now preferred today.

This invention is therefore based on the task of providing a floor tile of the above-mentioned type with a modified groove and tongue joint which will lock into place in the horizontal direction as well in the manner defined above, and which also guarantees a joint with high resistance to buckling between adjacent tiles.

In the case of a floor tile of the type mentioned above, this task is solved in that the edge profiles are contrived directly in the support material of the floor tile, in that the groove in the first tile is disposed directly above its tongue, in that the lower wall of this groove falls off towards the back end of the groove by the same degree as the tongue on the first tile rises upwards, in that the upper wall of the groove in the first tile runs essentially parallel to the plane of the tile, and in that the tongue on the second tile matches the shape of the groove in the first tile by having a top surface that runs essentially parallel to the plane of the tile and a bottom surface that falls off towards the end of the tongue.

Since in a certain sense the invention results in a double groove and tongue joint, adjacent tiles are mutually supported in relation to horizontal pull and pressure at several points preferably well spaced apart, so that the joint between adjacent tiles has a correspondingly high resistance to buckling. Even if the tiles are laid without glue in a floating configuration the floor will retain its precisely level position.

With regard to the terminology used here, it should be noted that comments are always made with reference to the tiles in the position in which they are shown in the drawings, which will be explained below. The terms "top" and "bottom" in particular should be understood in this sense. It is also evident, however, that the arrangement could equally well be reversed, i.e. that the positions "top" and "bottom" can be interchanged without departing from the scope of the invention.

Floor tiles of the above-mentioned type are generally made from derived timber products, in particular medium or high density fibreboard, but also from solid wood. Support tiles made from synthetically produced materials or recycled materials such as e.g. polyurethane recycling materials could also be used. The applicability of this invention is not limited with regard to the type of tile material used. In all cases, however, the invention relates to support tiles where the edge profiling is contrived directly in the material of the support tiles. This is not the case with DE 33 43 604 C2 as mentioned at the outset, because in this case the edge profile is formed by an extrusion profile which is connected with the support tile.

The extent of the undercut resulting from the interaction of the tongue on the first tile and the groove in the second tile will also depend in each case on the elasticity of the material. The undercut can be defined by selecting the inclination and the length of the tongue on the first tile. As a general rule, an angle of 15° is appropriate.

To facilitate the joining process, the edges at the front end of the tongues and the edges as the entrance to the grooves should preferably be tapered.

The tongue on the second tile is preferably disposed directly above its groove. The tongue on the second tile therefore forms the top limit of the groove in the second tile. The bottom surface of the tongue on the second tile is therefore inclined by the same degree as the tongue on the first tile. Whilst the tongue on the first tile has two essentially parallel top and bottom surfaces inclined upwards at an angle of e.g. 15°, the lower surface of the tongue on the second tile is inclined downwards towards the free end, as already mentioned, whilst the upper surface is essentially horizontal, i.e. parallel to the tile plane of the tiles to be joined. It is preferable to ensure that the projecting edges on the top and bottom sides of the tongue on the second tile are also tapered. The bottom edge simultaneously forms the top edge of the groove in the second tile.

In the event that the locking effect of the above-mentioned edge joint is insufficient, provision can be made for an additional locking rib with engages with a lokking groove in the other tile. The locking rib can be disposed either on the top or bottom surface of one of the tongues, or, alternatively, on the top or bottom wall of one of the grooves. The locking rib is preferably disposed on the top surface of the tongue on the second tile and the matching locking groove is disposed in the top wall of the groove in the first tile. Basically, however, it is of no importance on which of the tongues the locking rib or locking groove takes effect, or whether this happens on the top or bottom side of the tongue.

If this additional locking means is used, the two tongues can possibly be made shorter, or can be angled to a lesser degree.

The vertical cross-section of the locking rib and locking groove is preferably contrived as a trapezoidal or rounded trapezoidal shape which therefore has sides that slope to a greater or lesser degree. Steep or even vertical sides result in greater rigidity, but render this assembly and disassembly process more difficult.

Another embodiment of the invention is based on a combination of features of the embodiments described above. In this embodiment too, adjacent tiles are held together with a high degree of stability in a level position and prevented from warping or buckling in the vicinity of the seam. The profile in question here is also a double groove and tongue profile with relatively simple, stable profile elements and a relatively low volume of waste in the region of the edge profiles.

A floor tile according to this embodiment in conjunction with the features of the floor tile mentioned above is characterized in that the edge profiles are contrived directly in the support material of the floor tile, in that the tongue on the first tile projects beyond the front end of the first tile, in that the surface on the top side of the tongue on the first tile falls off at an angle into the groove in the first tile, in that the tongue on the second tile has an upwardly projecting rib on its outer edge, and in that a locking groove which corresponds with the rib is provided in the top wall of the groove in the first tile.

With this type of profile adjacent tiles support each other mutually in the upper portion of their front ends, and the tongue on the first tile also rests in the groove in the second tile. This results in two relatively widely spaced support points which securely retain adjacent tiles in a plane-parallel position and prevent them from tilting up or down. Further support is provided in the groove in the first tile, in which the rib on the tongue of the second tile and the locking groove in the groove in the first tile interact.

The advantages achieved are based in particular on the fact that the tongue on the first tile projects beyond its front end and is also inclined upwards at an angle. As a result, this means that the groove in the first tile is at least covered over by the tongue on the first tile and that the locking groove inside the groove in the first tile cannot be milled from outside the groove using a rotating milling cutter. The profile of the invention on the tile edges can therefore only be pre-prepared with the help of milling cutters, with at least partial reworking being required using planing tools which are moved along in the longitudinal direction of the profile edges, or with the profile edges being moved along the planing tools. One advantageous side effect of using such planing tools is that the profiles can be worked with great precision.

This problem also exists with certain feature combinations of the embodiments described above. Any disadvantages arising out of the need for planing also being required in addition to milling are compensated by the fact that the resultant profiles are particularly deep and can be inter-anchored with a high degree of stability.

Other features and advantages of the invention derive from the sub-claims. Preferred embodiments of the invention will be explained in more detail below with reference to the enclosed drawings, in which:

Figure 1:
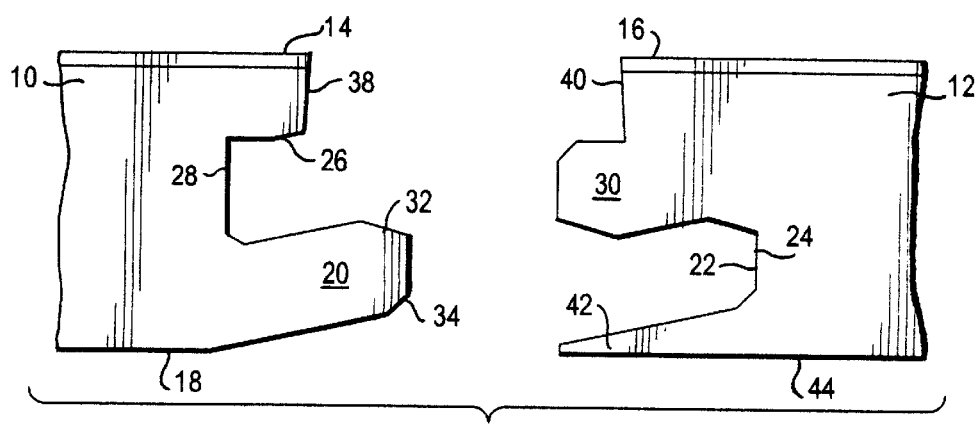
FIG. 1 shows a schematic section of the adjacent edges of two tiles to be joined.
Figure 5:
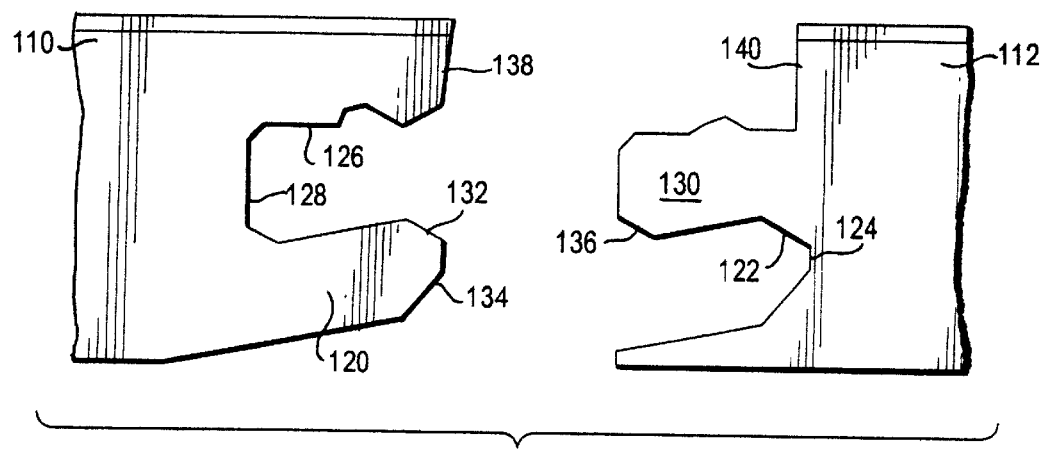
Figure 6:
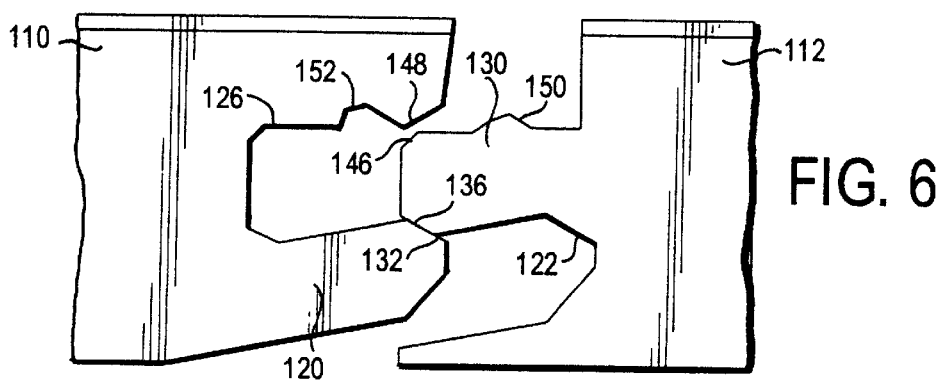
Figure 7:
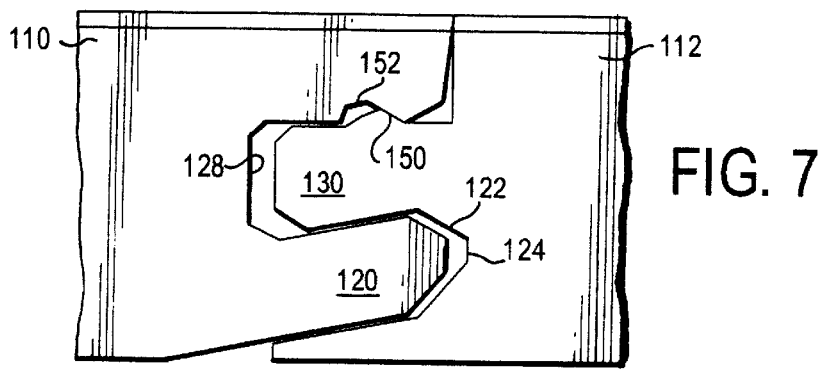
Figure 8:
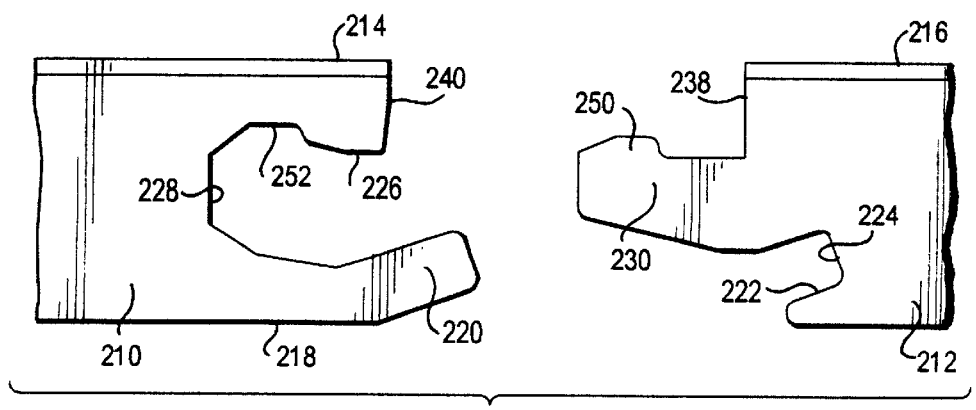
Figure 9:
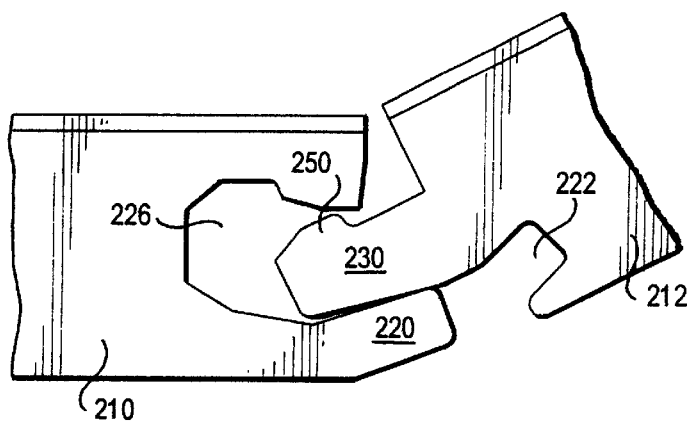
Figure 10:
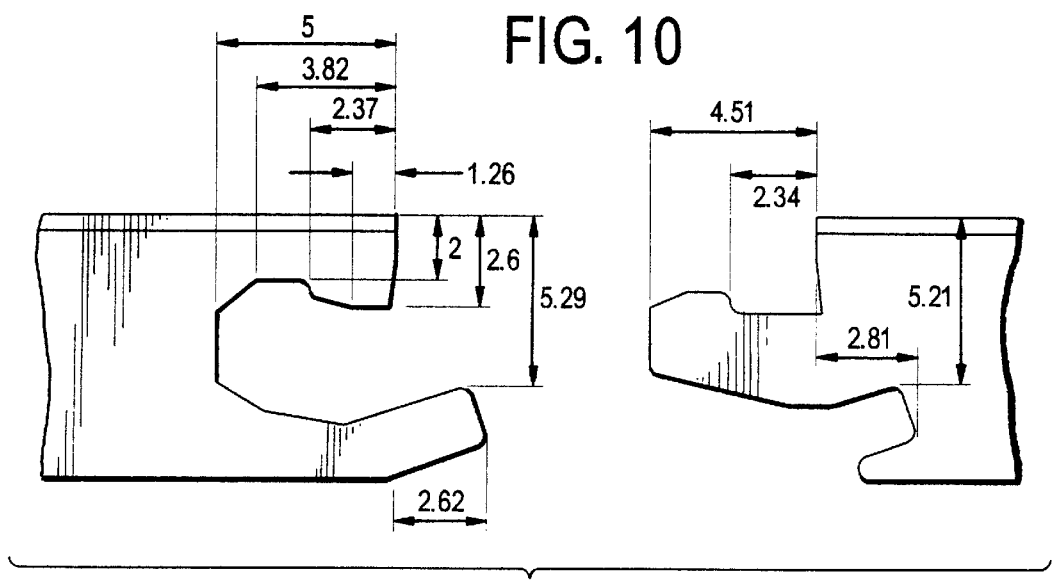

FIG. 5 corresponds to FIG. 1, but shows another embodiment of the floor tiles;

FIG. 6 shows the first step in joining together the two tile edges;

FIG. 7 is a section showing the position of the joined-up tiles;

FIG. 8 is a another embodiment showing a schematic section through two tile edges to be joined-up, before they are brought together;

FIG. 9 shows two floor tiles to be joined up with the edge profiles of FIG. 8 during the laying process;

FIG. 10 corresponds to FIG. 8, but also contains some measurements of a preferred embodiment in millimetres.

FIG. 1 shows the edges of two floor tiles to be joined, of which the left-hand one will be referred to below as the first tile, 10, and the right-hand one as the second tile, 12. Tiles 10, 12 may be made from a laminate, from a derived limber product and/or plastic, or from solid wood. A top covering layer 14,16 is shown here by way of example. The first tile 10 shown on the left of FIG. 1 has a tongue 20 that rises up from the bottom surface 18 of the first tile and engages with a groove 22 in the second tile 12, said groove rising upwards towards the inside of groove 22, i.e. towards the back end 24 of the groove by the same degree as tongue 20 rises upwards.

Disposed in the first tile above the obliquely rising tongue 20 there is a groove 26 whose bottom wall, which is formed by the top surface of tongue 20, falls way towards the back end 28 of the groove. In contrast, the top wall of groove 26 runs essentially horizontally, parallel to the tile plane of the two tiles 10, 12.

The top of groove 22 in the second tile 12 is defined by a wall that rises upwards at an angle towards the back end 24 of the groove, forming the bottom surface of a tongue 30 on the second tile 12. This tongue 30 has a top surface that runs essentially horizontally, parallel to the plane of the tile to match the cross-section of groove 26 in the first tile.

The top and bottom edges of the end of tongue 20 on the first tile 10 are each contrived with a taper 32,34 to facilitate the insertion into groove 22. The top edge of this groove 22 also has a taper 36, which simultaneously forms the bottom edge of tongue 30.

Above groove 26 in the first tile 10 and tongue 30 on the second tile 12 there are vertical front faces 38,40, which come into contact with each other when the tiles are laid, thereby defining the position of the tiles. Groove 22 in the second tile 12 is downwardly limited by a lip 42, whose top surface is formed by the wall of groove 22, and which is in turn downwardly limited by the bottom surface 44 of the second tile 12.

Figure 2:
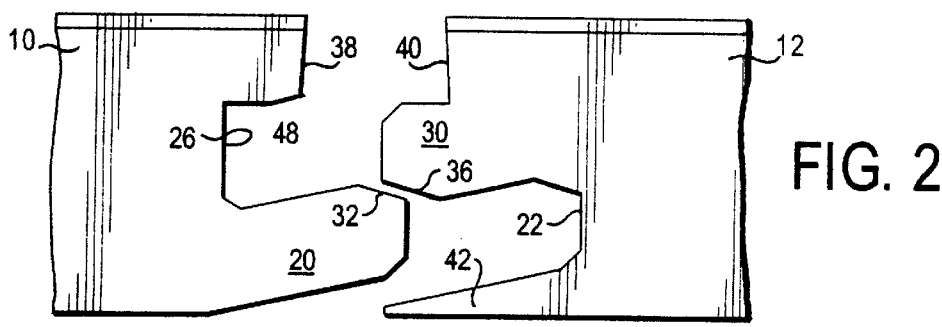
FIG. 2 is a corresponding representation of a first step in the process of joining up the tiles.
Figure 3:
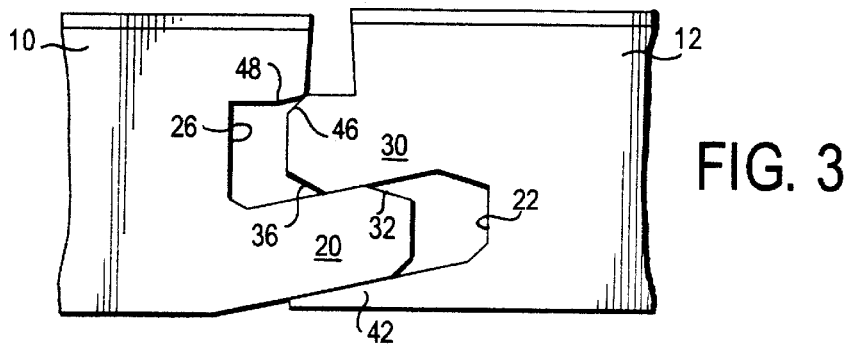
FIG. 3 shows a further step in the process of joining up the tiles.
Figure 4:
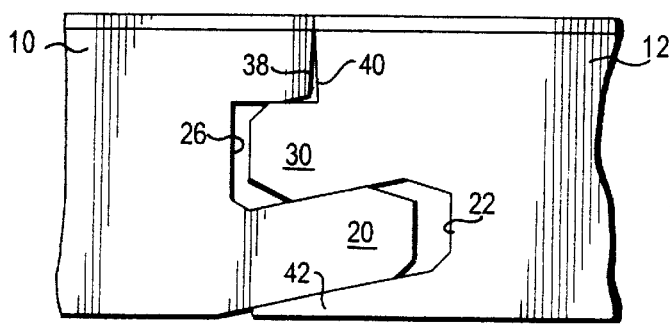
FIG. 4 is a corresponding representation showing the tiles in their joined-up end position.

FIGS. 2 to 4 show three consecutive steps in the process of laying the floor tiles of the invention according to the first embodiment shown in FIG. 1.

As shown in FIG. 2, taper 32 on the top edge of tongue 20 and taper 38 on the bottom edge of tongue 30 on the second tile 12, which simultaneously forms the top edge of groove 22, come into contact with each other first. Provided the material is sufficiently flexible, tongue 20 on the first tile 10 is bent slightly downwards in the process, whilst tongue 30 on the second tile is bent slightly upwards. If the material of tiles 10,12 is less flexible, the second tile 12 is raised very slight upwards, as shown in FIG. 3.

In this case, the upper edge of tongue 30 on the second tile 12, which is provided with a taper 46, abuts against the top edge of groove 26, which is also provided with a taper 48.

Despite the interacting tapers 46,48, when the two tiles are pushed together the slight over-dimensioning of tongue 30 in relation to the recess of groove 26 has to be overcome by elastic deformation in order for the tiles to finish up in the position shown in FIG. 4. In the position shown in FIG. 4, the end position of the two tiles 10,12 is determined by the top portion of the two front ends 38,40. Tongues 20,30 do not, however, come into contact with the respective back ends 24,28 of the grooves, thereby reliably eliminating the possibility of an open gap forming on the top surface of tiles 10,12.

FIGS. 5 to 7 show another embodiment of the invention which basically coincides to a large degree with the first embodiment, but nevertheless differs in one or two significant ways. To allow a direct comparison between the two embodiments, the same reference numbers increased by 100 will be used for the second embodiment. One of the main differences with respect to the first embodiment is that the tongue 120 on the first tile 110 is considerably shorter than in the first embodiment, whilst the tongue 130 on the second tile 112 is longer on the other hand. Tongue 120 on the first tile essentially ends in the same plane as the top front end 138 of the first tile 110.

Otherwise, however, tongue 120 on the first tile is also inclined upwards in the second embodiment, e.g. at an angle of 15°, and groove 122 in the second tile 112 runs obliquely upwards at the same angle towards the back end, 124, of the groove. As a result, the bottom edge of groove 126 in the first tile 110 also falls away towards the back end 128 of the groove, whilst the associated tongue 130 on the second tile 112 runs obliquely downwards towards its free end, i.e. towards the left in FIG. 5.

Tapers are also contrived on the outer edges of tongues 120,130 and on the edges of grooves 126, 122 in the second embodiment.

When the two tiles 110,112 are pushed together, tapers 146 and 148 on the top edge of tongue 130 and the top edge of groove 126 abut against each other so that the elements involved necessarily undergo a certain deformation. Just afterwards in the process of pushing the tiles together, tapers 132 and 136 on the top edge of tongue 120 and the bottom edge of tongue 130 abut against each other as can be seen in FIG. 6.

Another particularity of the second embodiment is that on the top surface of tongue 130 on the second tile 112, there is a locking rib 150 running in the longitudinal direction of tongue 130, which matches with a locking groove 152 in the top wall of groove 126 in the first tile 110. Locking rib 150 has a flattened or rounded trapezoidal shaped cross-section, i.e. has slightly rising flanks on both sides to facilitate insertion into groove 126 and—in the event of the tiles being separated—removal from locking groove 152.

In the end position shown in FIG. 7, the top portion of front ends 138 and 140 once again determines the end position. The locking effect is guaranteed by both the interaction of locking rib 150 with locking groove 152, and by the interacting sloping surfaces of tongue 120 on the first tile 110 and tongue 130 on the second tile 112.

In FIG. 8 a first tile is designated as 210 and a second tile as 212. The two tiles 210 and 212 are preferably made overall from a derived timber product, in particular medium or high density fibreboard, and are provided with a top covering layer 214,216 in the example shown. The bottom surface 218 may be provided with e.g. a sound-absorbing layer (not shown).

Rising upwards at an angle from the bottom surface 218 of the first tile 210 is a tongue 220 whose angle of inclination is somewhere in the order of 15°. Tongue 220 on the first tile 210 engages with a groove 222 in the second tile 212 which, just like tongue 220, has an essentially rectangular cross-section with parallel upper and lower walls, as will be explained in more detail below.

Groove 222 in the second tile 212 rises upwards at the same angle as tongue 220 on the first tile 210. The dimensions are selected so that tongue 220 on the first tile 210 rests against the back end 224 of groove 222.

Above tongue 220 on the first tile 210 there is a groove 226 in the first tile whose bottom wall is formed by the top surface of tongue 220 on the first tile and falls off into the groove at an angle, but then rises in an arched shape, or in several kinks, towards the back end 228 of the groove up to essentially the height of the tongue 220 so that overall, a profile like a trough forms the bottom wall of groove 226.

Groove 226 serves to accommodate a tongue 230 on the second tile 212. Tongue 230 has a horizontal top surface which runs parallel to the tile plane. The front bottom edge of tongue 230 on the second tile 212 is provided with a taper 236 which facilitates the process of pushing tongue 230 over the top corner of tongue 220 on the first tile when the tiles are joined together.

Above groove 226 in the first tile and tongue 230 on the second tile there are essentially vertical, or slightly reclining front ends 238,240 which meet up when the tiles are laid and determine the position of the tile. In addition to this support for the tiles 210,212 in the top portion, the tiles are also supported in the bottom portion by the interaction between tongue 220 and groove 222. Due to the inclination at which groove 222 is contrived in the second tile 212, a triangular lip 242 is created underneath this groove which engages with tongue 220 from underneath.

On the top surface of tongue 230 on the second tile 212, the outer front edge is provided with an upwardly projecting essentially trapezoidal locking rib 250, which engages with a locking groove 252 in the top wall of groove 226 in the first tile.

Some other particularities of the edge profiling of the two tiles 210,212 will be described below. The bottom surface of tongue 230 on the second tile 212 initially slopes down away to the left from the back end 224 of the groove in line with the shape of groove 222 in the second tile, but then runs into a horizontal section at the level of front end 238, and then rises again towards the free end of tongue 230.

The latter upward inclination in the bottom surface facilitates the process of joining up adjacent tiles. The locking rib 250 on the outer front edge of tongue 230 has sloping surfaces on both sides, of which the sloping surface positioned towards the end is flatter, and the more rearward sloping surface is steeper, as shown in FIG 8.

The top surface (not designated) of groove 226 in the first tile runs horizontal or parallel to the tile plane, but has sloping surfaces on both sides of the locking groove 252.

FIG. 9 shows the two adjacent tiles in the assembled position. It can be seen that a support is provided both in the vicinity of the two front ends 238, and also between tongue 220 on the first tile and the back end 224 of the groove 222 in the second tile. At the same time the generously dimensioned locking rib 250 engages within locking groove 252 with the wall portion of the top wall of groove 226 which limits the groove.

This multiple support provided at widely spaced points eliminates the formation of an articulated joint between adjacent tiles, which would in turn cause instability around the connected edge sections.

The embodiment of FIGS. 8 to 10 is particularly well suited for pre-glued tile systems in which an adhesive that can be activated during the laying process by pressure, moisture or heat is applied in advance in the vicinity of groove and tongue. With this kind of glueing it is very difficult with many tile systems to displace adjacent tiles laterally in relation to each other. With the system according to the invention and according to FIGS. 8 to 10, the contact surfaces in the slightly angled position of the newly added tile are small so there is no reason to fear any blocking of the newly added tile as a result of pre-glueing. Furthermore, the newly added tile can be brought in at a far steeper position than the one shown in FIG. 9. Thanks to the trough shape of the bottom wall of groove 226 in the first tile, which matches the bottom surface of the tongue on the second tile, the tiles can always be brought together smoothly and with little force after being lowered out of the position shown in FIG. 9.

Many of the elements shown in conjunction with the three embodiments described here are suited to all three embodiments.

In particular a locking rib as shown in FIGS. 5 to 7 and in FIGS. 8 to 10, for example, can also be used for the embodiments of FIGS. 1 to 6. The locking rib may be disposed in more or less any position on the top surface of the tongue of the second tile, namely in the central portion, as shown in FIGS. 5 to 7, or at the outer end.

What is claimed is:

1. A floor tile comprising a top surface;

a support material; and an edge profile on at least two opposite edges of the floor tile, the edge profile comprising a modified groove and tongue joint for the purpose of connecting a first tile and a second tile, the modified tongue and groove joint comprising at least one groove and one tongue on each of at least two edges, wherein a tongue on one edge of the first tile and a groove in an associated edge of the second tile rise obliquely upwards from the bottom of the tile, wherein the edge profiles are contrived directly in the support material of the floor tile, in that the tongue on the first tile projects distally beyond said top surface of the first tile in that the surface on a top side of the tongue on the first tile falls away at an angle into a groove in the first tile, in that the tongue on the second tile has an upwardly projecting locking rib on its outer edge, and in that a locking groove which corresponds with the locking rib is provided in a top wall of the groove in the first tile.

2. The floor tile of claim 1, wherein the locking groove in the groove in the first tile is contrived to border on the back end of the groove.

3. The floor tile of claim 1, wherein the locking groove in the first tile is limited by inclined surfaces.

4. The floor of claim 3, wherein the sloping surface of locking groove oriented towards the back end of the groove is flatter than the sloping surface oriented towards the exterior.

5. The floor tile of claim 1, wherein the top surface of tongue on the second tile runs parallel to the tile surface.

6. The floor tile of claim 5, wherein the locking rib on the top surface of tongue on the second tile runs into the top surface of tongue via inclined surfaces.

7. The floor tile of claim 1, wherein the bottom side of tongue on the second tile falls away at an angle from its root in the vicinity of the groove in the second tile up to the end of groove and then rises slightly again from the region of the front end of the second tile.

8. The floor tile of claim 1, wherein the amount by which tongue on the first tile projects beyond the top surface corresponds to at least half the depth of the groove contrived in the first tile.

9. The floor tile of claim 1, wherein the position in which the tongue on the first tile rises up from a bottom of the first tile side is located essentially at a plane vertically coincidental with the front end of the first tile.

10. The floor tile of claim 1, wherein the depth of groove in the second tile is approximately half as large as the depth of groove in the first tile.

11. The floor tile of claim 1, wherein each of the tongue on the first tile and groove in the second tile rise by about 15° from the horizontal.

12. The tile of claim 1, wherein the tile is a laminate panel.

13. The tile of claim 1, wherein the tile is a parquet element.

* * * * *